(12) United States Patent
Katsube et al.

(10) Patent No.: US 7,150,830 B1
(45) Date of Patent: *Dec. 19, 2006

(54) PERMSELECTIVE MEMBRANE MODULE

(75) Inventors: Mikio Katsube, Iwakuni (JP); Kazuhide Nita, Iwakuni (JP); Masaaki Sekino, Iwakuni (JP)

(73) Assignee: Toyo Boseki Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1293 days.

(21) Appl. No.: 09/066,168

(22) Filed: Apr. 24, 1998

(30) Foreign Application Priority Data

Apr. 24, 1997 (JP) ................... 9-107456

(51) Int. Cl.
*B01D 63/00* (2006.01)
*B01D 61/00* (2006.01)

(52) U.S. Cl. .............. 210/321.8; 210/321.79; 210/433.1; 210/446; 96/4; 96/9

(58) Field of Classification Search .............. 210/321.78–321.8, 321.56, 321.88–321.9, 210/433.1, 446, 500.23, 652; 96/4, 8
See application file for complete search history.

(56) References Cited

U.S. PATENT DOCUMENTS

| | | | | |
|---|---|---|---|---|
| 4,080,296 A | * | 3/1978 | Clark | 210/321.8 |
| 4,293,419 A | * | 10/1981 | Sekino et al. | 210/321.8 |
| 4,451,369 A | * | 5/1984 | Sekino et al. | 210/321.9 |
| 4,632,756 A | * | 12/1986 | Coplan et al. | 210/323.2 |
| 4,670,145 A | * | 6/1987 | Edwards | 210/323.2 |
| 4,781,834 A | * | 11/1988 | Sekino et al. | 210/321.88 |
| 4,880,440 A | * | 11/1989 | Perrin | |
| 5,071,552 A | * | 12/1991 | Bikson et al. | 210/321.8 |

(Continued)

FOREIGN PATENT DOCUMENTS

| | | |
|---|---|---|
| EP | 0053635 | 6/1982 |
| GB | 1566675 | 5/1980 |
| WO | WO 93/07958 | 4/1993 |

OTHER PUBLICATIONS

Takashi Matsuura, Synthetic membrane and Membrane Separation processes, CRC press, p. 314, 1994.*

(Continued)

*Primary Examiner*—Ana Fortuna
(74) *Attorney, Agent, or Firm*—Kenyon & Kenyon LLP

(57) ABSTRACT

Disclosed is a permselective membrane module comprising i) two permselective membrane elements formed of hollow fibers arranged substantially in parallel and bundled together and ii) a container, the two elements being arranged in the container longitudinally of the hollow fibers, wherein the respective elements comprise i) a feed tube disposed longitudinally of the hollow fibers and ii) a hollow fiber bundle covering the outer surface of the feed tube, the feed tube having a number of holes therein, and the hollow fibers having one end closed and the other end opened, wherein the feed tubes of the two elements communicate with each other via a connecting tube to form a conduit having one end opened and the other end closed, and wherein the container comprises i) an inner wall surrounding the two elements with a space, ii) a feed port provided at one end of the container in communication with the opened end of the conduit, iii) a permeate-liquid outlet facing the open end of the hollow fiber bundle of each element and extending through the container wall, and iv) a non-permeated fluid discharge outlet communicating with the gap between the container and the outer surface of each element and extending through the container wall.

4 Claims, 3 Drawing Sheets

U.S. PATENT DOCUMENTS

| | | | |
|---|---|---|---|
| 5,137,631 A | * | 8/1992 | Eckman et al. |
| 5,139,669 A | * | 8/1992 | Clermont et al. ........ 210/321.8 |
| 5,160,042 A | * | 11/1992 | Bikson et al. |
| 5,380,433 A | * | 1/1995 | Etienne et al. ........... 210/321.8 |
| 5,470,469 A | * | 11/1995 | Eckman ................... 210/321.8 |
| 5,814,179 A | * | 9/1998 | Ohmori et al. .......... 210/321.8 |
| 5,851,267 A | * | 12/1998 | Schwartz ................. 210/321.8 |
| 5,885,454 A | * | 3/1999 | Yagihashi et al. |
| 6,251,275 B1 | * | 6/2001 | Rekers |

OTHER PUBLICATIONS

Patent Abstracts of Japan, vol. 013, No. 095 (C-573), Mar. 6, 1989 & JP 63 274406 A (Mitsubishi Heavy Ind., Ltd.), Nov. 11, 1988.
Database WPI, Section Ch., Week 8851, Derwent Publications Ltd., London, GB; Class D15, An 88-364526 XP002085960.

* cited by examiner

PERMSELECTIVE MEMBRANE MODULE

DETAILED DESCRIPTION OF THE INVENTION

The present invention concerns a permselective membrane module made of hollow fibers and used for desalination.

PRIOR ART

There are classified several types of permselective membranes according to the size of a substance to be separated. Examples of such membranes are ultrafilters or microfilters for separating colloids, proteins or the like, nano-filters for separating low molecular organic matters such as agricultural chemicals or the like, and reverse osmosis membranes used for separation of ions. The reverse osmosis membranes are those used under a higher pressure than the osmotic pressure of liquid to be treated (hereinafter, "liquid to be treated" is referred to as "feed liquid").

The membranes can also be classified into flat type, tubular type, spiral type and hollow fiber type in view of shape. Among them, the hollow fiber type can be used without support materials usually required in the flat type, the tubular type or the spiral type, and therefore the hollow fiber type has a high efficiency of separation per unit volume. Thus, the hollow fiber type membranes are more suitable for membrane-separation.

Explained herein is a permselective membrane module made of hollow fibers. Generally, the hollow fiber membrane module comprises at least one element consisting of a winding, aggregate or the like of permselective membranes and a pressure vessel for accommodating these elements. Usually, one or two elements are provided in the pressure vessel of the module. Particularly, in case of producing a large volume of treated liquid, the module generally comprises two elements.

In the case of using a winding or aggregate of permselective membranes of hollow fibers, as the element, it is necessary to form an opening in either end of the element so as to collect permeate and discharge the water via the opening. Accordingly, considering the occurrence of pressure loss in a feed liquid in the pressure vessel, generally up to two elements are provided in the pressure vessel. The elements usually has an feed tube that is integrated with the central portion of the element. A number of holes are formed in the feed tube so as to distribute the feed liquid to reverse osmosis membranes of hollow fibers. These holes allow the feed liquid to flow within the pressure vessel. In the case of using an element formed of the reverse osmosis membranes, the flowing direction of the feed liquid in the element much influences the separation properties of the reverse osmosis membranes.

That is, when the feed liquid flows only in one direction, i.e., flows radially outwardly of the element from the feed tube, the hollow fibers expand outwardly. By contrast, when part of the feed liquid flows into the feed tube from the element, the hollow fibers are inwardly compressed and aggregate densely. This phenomenon is called "nestling" that increases the pressure loss of the feed liquid and thereby lower the separation performance of the module.

Japanese Unexamined Patent Application No. 507810/1993 (PCT/US92/08819) discloses a reverse osmosis membrane module of hollow fibers which can prevent the occurrence of nestling.

The module disclosed therein has a double tubular structure wherein a feed tube of a first element is connected to that of a second element by a central connecter, and wherein a discharge tube of smaller diameter is provided in the feed tube of the second element.

More specifically, Japanese Unexamined Patent Application No. 507810/1993 discloses providing an opening in the outer surface of the central connecter between the feed tubes of the two elements, so that the opening may communicate with the discharge tube. This double tubular structure enables the feed liquid to flow only in one direction in the element, i.e., radially outwardly of the element from the feed tube.

However, the thus constructed reverse osmosis membrane module is likely to cause too much pressure loss due to the friction resistance generated on the tube inner wall, since the module is of a double tubular structure which further comprises a discharge pipe in the feed tube of the second element. In addition, contracted flow is likely to occur when the feed liquid flows into the discharge pipe, which results in an increased pressure loss.

Further, because of the double tubular structure, it is complicated to attach or replace the element in the pressure vessel.

It is an object of the present invention to provide a permselective membrane module which comprises two elements of hollow fiber membranes and is capable of reducing the pressure loss of a feed liquid to thereby improve the separation performance of the elements.

SUMMARY OF THE INVENTION

The present invention provides a permselective membrane module comprising i) two permselective membrane elements formed of hollow fibers arranged substantially in parallel and bundled together and ii) a container, the two elements being arranged in the container longitudinally of the hollow fibers, wherein the respective elements comprise i) a feed tube disposed longitudinally of the hollow fibers and ii) a hollow fiber bundle covering the outer surface of the feed tube, the feed tube having a number of holes therein, and the hollow fibers having one end closed and the other end opened, wherein the feed tubes of the two elements communicate with each other via a connecting tube to form a conduit having one end opened and the other end closed, and wherein the container comprises i) an inner wall surrounding the two elements with a space, ii) a feed port provided at one end of the container in communication with the opened end of the conduit, iii) a permeate-liquid outlet facing the open end of the hollow fiber bundle of each element and extending through the container wall, and iv) a non-permeated fluid discharge outlet communicating with the gap between the container and the outer surface of each element and extending through the container wall. Accordingly, it is possible to produce a simplified membrane module at low cost which module is capable of preventing the pressure loss of feed liquid, thereby separating the feed liquid efficiently. Further, since the module does not have a double tubular structure, it is possible to prevent the unwanted increase of pressure loss. Furthermore, because of the simplified structure, it is possible to readily monitor the decrease of the separation performance, etc. of the module, thereby readily controlling the quality of produced water. Still further, according to the present invention, it is possible not only to wash the element in a forward-direction (i.e., radially outwardly of the element from the feed tube), but also to wash the element in a reverse direction washing (i.e., in a direction from the outer side of the element to the feed tube), thereby improving washing efficiency.

The present invention further provides a permselective membrane module comprising i) two permselective membrane elements formed of hollow fibers arranged substantially in parallel and bundled together and ii) a container, the two elements being arranged in the container longitudinally of the hollow fibers, wherein the respective elements comprise i) a feed tube disposed longitudinally of the hollow fibers and ii) a hollow fiber bundle covering the outer surface of the feed tube, the feed tube having a number of holes therein, and the hollow fibers having one end closed and the other end opened, wherein the feed tubes of the two elements have one end opened and the other end closed, and wherein the container comprises i) an inner wall surrounding the two elements with a space, ii) a feed port provided at one end of the container in communication with the opened end of the feed tube of one of the elements, iii) an inner liquid receiving plate located between the two elements to collect the liquid not permeated through said one elements, iv) a connecting tube for connecting the inner liquid receiving plate with the open end of the feed tube of the other element, v) a permeate-liquid outlet facing the open end of the hollow fibers of each element and extending through the container wall, and v) a non-permeated fluid discharge outlet communicating with the space between the container and the outer surface of the other element and extending through the container wall thereby attaining the same advantages as described above.

Preferably, the distance d between the centerline of the discharge outlet and one end of the membrane module is in the range of 0.1 m to 0.6 m.

Preferably, the distance d between the centerline of the discharge outlet and the opposite end of the membrane module relative to the feed port is in the range of 0.1 m to 0.6 m.

DETAILED DESCRIPTION OF THE PREFERRED EMBODIMENTS

The preferred embodiments of the present invention will be described below with reference to the accompanying drawings, but it is to be noted that the present invention is not necessarily restricted to the embodiments herein.

Embodiment 1

Figure 1:
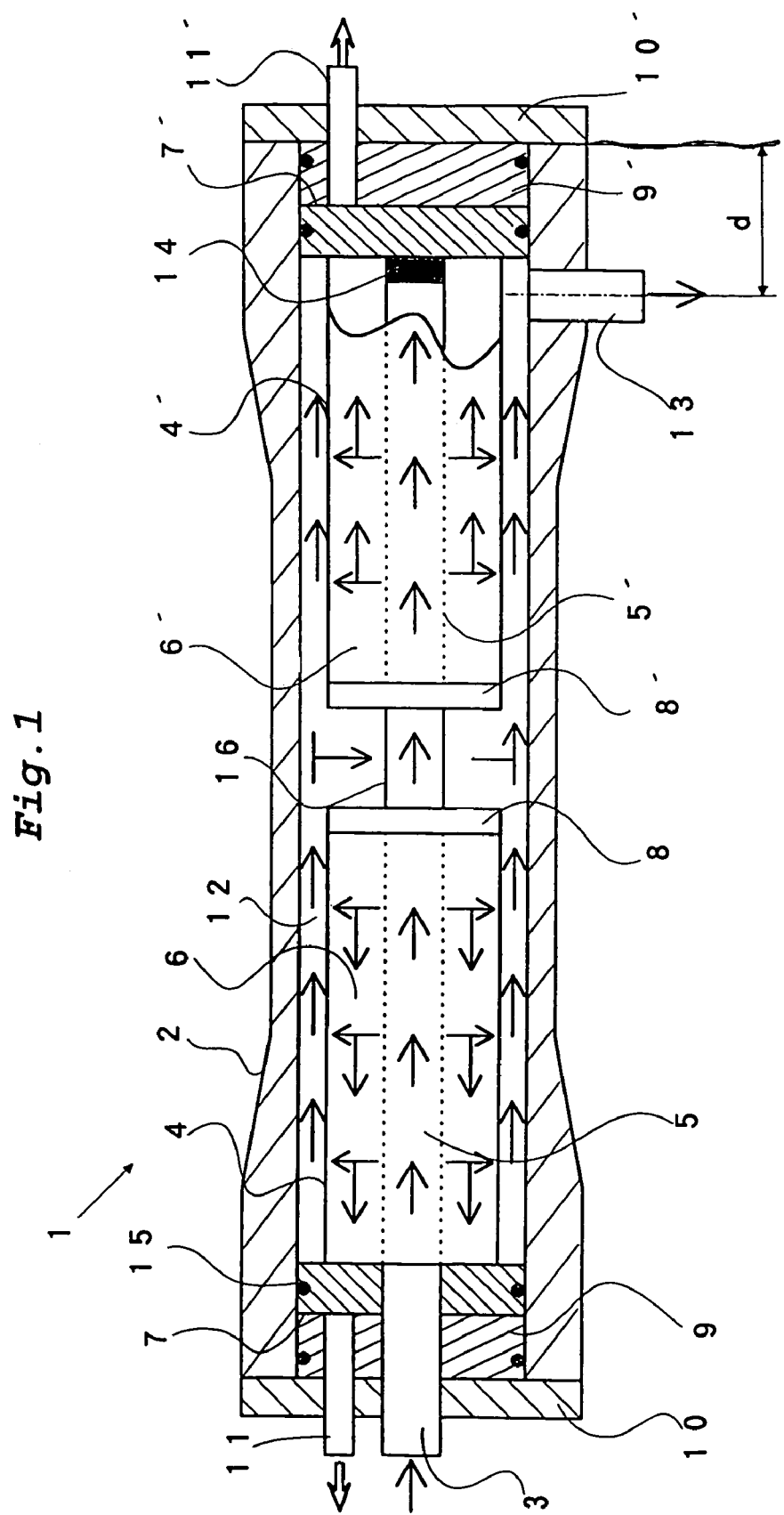
FIG. 1 is a cross section schematically showing the membrane module of the first embodiment of the present invention.

The first embodiment of the present invention will be described with reference to FIG. 1. FIG. 1 is a schematic view of a permselective membrane module 1 of the first embodiment.

The module 1 of the first embodiment comprises first and second permselective membrane elements 4, 4' made of Hollow fibers, each element being inserted from the opposite ends of a cylindrical pressure vessel 2 and then longitudinally aligned such that deflector blocks 8, 8' be opposed to each other. An inner connecting tube 16 is provided between the deflector blocks 8, 8' of the elements 4, 4'. Via the inner connecting tube 16, feed tubes 5, 5' of the first and second elements 4, 4' are connected at the central portion of the cylindrical pressure vessel 2. The feed tubes 5, 5' comprise a number of holes for communicating the feed tubes with the elements 4, 4', respectively. A plug 14' closes the end of a tube sheet 7' of the feed tube 5' of the second element 4'. Attached at the opposite ends of the cylindrical pressure vessel 2 are support plates 9, 9' and end plates 10, 10'. The respective components are sealed with O-rings 15 or the like.

The feed liquid is fed via a fluid inlet 3 into the feed tube 5 of the first element 4. As described, the feed tube 5 is connected to the feed tube 5' of the second element 4' by the inner connecting tube 16 so that the feed liquid also flows into the feed tube 5'. One end of the feed tube 5' is sealed by a plug 14, so that the feed liquid flowed into the feed tubes 5, 5' flows out toward the elements 4, 4' via their holes, i.e., flows radially outwardly of the hollow fiber layers 6, 6'. When the feed liquid passes through the hollow fiber layers 6, 6', only purified water selectively permeates the hollow fibers because of the permselective properties of the hollow fiber layers 6, 6'. After passing therethrough, the permeate purified water flows out of the hollow fibers through the tube sheets 7, 7'. Then, the purified water is collected by support plates 9, 9' and discharged from the pressure vessel via fluid outlets 11, 11'.

On the other hand, the non-permeated liquid passes through a gap 12 between the cylindrical pressure vessel 2 and the two elements 4, 4' and is then discharged out of the pressure vessel via a discharge outlet port 13.

As described, according to the hollow fiber membrane module 1 of the first embodiment, the feed liquid in the module flows only radially outwardly of the elements 4, 4' from the feed tubes 5, 5' to the elements 4, 4', and the non-permeated liquid is discharged from the discharge outlet port 13 provided in the side face of the cylindrical pressure vessel 2.

According to the hollow fiber membrane module 1 of the present first embodiment, it is possible to prevent the increase of pressure loss in the module which loss is caused by the dense formation (nestling) of hollow fiber membranes because the feed fluid flows from inside to outside the elements 4, 4'. Further, the feed tube 5' of the second element 4' does not employ double tubular structure, which also contributes to the prevention of the increased pressure loss in the module. Accordingly, it is possible to separate feed liquid more efficiently as compared with prior art permselective membrane modules of hollow fibers.

Further, according to the first embodiment, in washing the module, it is possible not only to wash the element in a forward-direction (i.e., radially outwardly of the element from the feed tube), but also to wash the element in a reverse direction washing (i.e., in a direction from the outer side of the element to the feed tube).

Further, it is possible to reduce the production cost because of the simplified module structure and also to readily monitor the reduction of the performance, etc. of the module because of the simple flow of a feed liquid, thereby readily controlling the quality of produced water.

Considering the operational efficiency of the installation or the maintenance of the module, the discharge outlet is preferably located such that the distance d, i.e., the distance between the end of the cylindrical pressure vessel and the centerline of the discharge outlet be in the range of 0.1 m to 0.6 m, more preferably 0.2 m to 0.4 m.

The reason for 0.1 m≤d is as follows. That is, a tube sheet ring is located 0.1 m or less distant from the opposite ends of the pressure vessel to hold the open end of the hollow fiber membranes. Accordingly, if 0.1 m>d, it becomes difficult to provide the sheet ring in the pressure vessel.

Further, the reason for d≤0.6 m is that if d>0.6 m, it becomes difficult to attach the module and also it is hard to purge suspended materials because of too large a dead space generated. Therefore, it is difficult to fully discharge non-permeated liquid.

Embodiment 2

Figure 2:
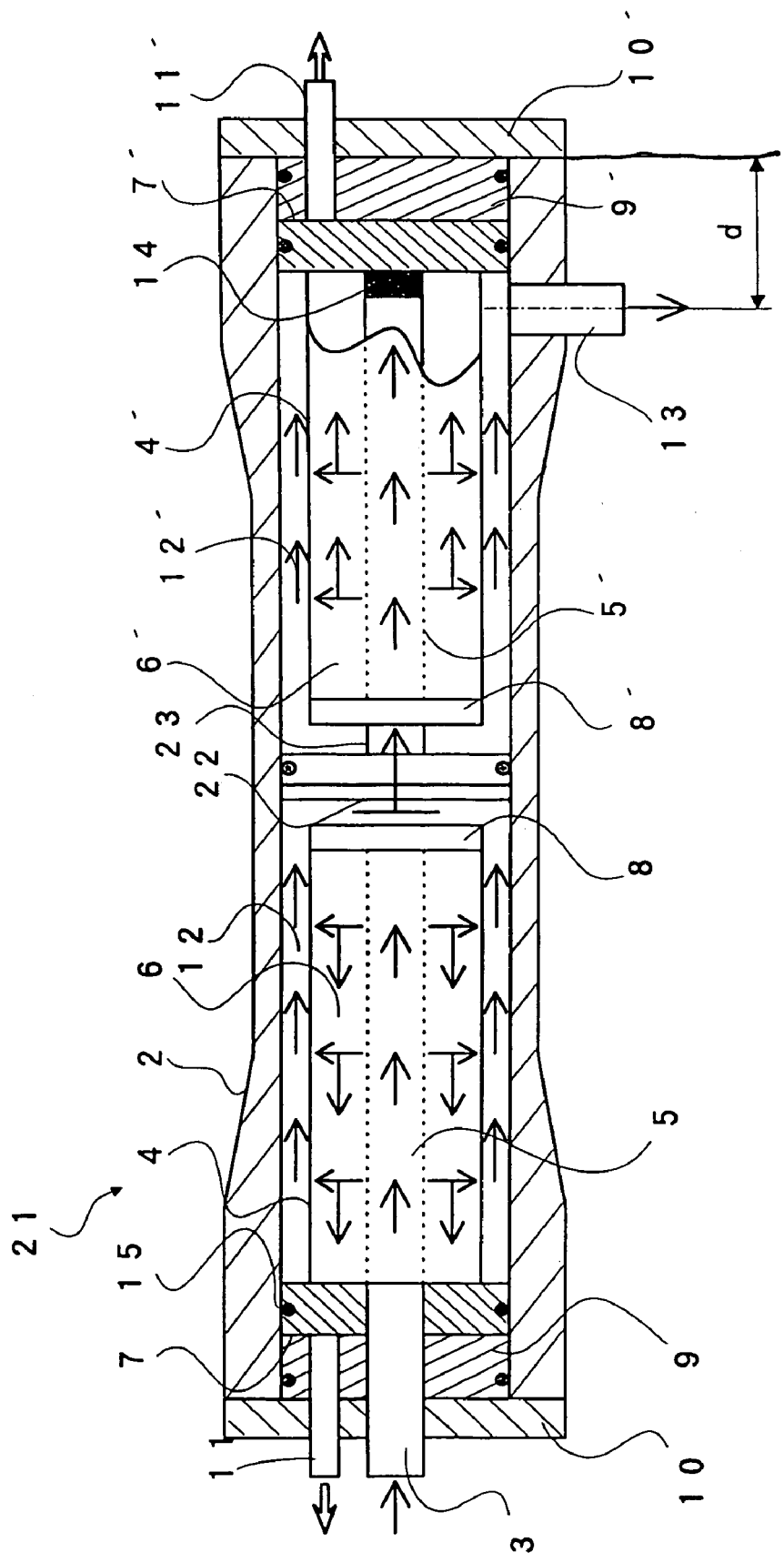
FIG. 2 is a cross section schematically showing the membrane module of the second embodiment.

The second embodiment of the present invention will be described with reference to FIG. 2. FIG. 2 schematically shows a permselective membrane module 21 of hollow fibers according to the present embodiment. The same parts as in the previous embodiment are denoted by the same reference numerals, and the explanations therefor are omitted.

The module 21 of the second embodiment employs the following features in the module of the first embodiment, that is, one end of the feed tube 5 of the first element 4 is sealed with a deflector block 8. Further, the second embodiment employs an inner support plate 22 that is provided between the first and second elements 4, 4' in lieu of the inner connecting pipe 16, so that the inner support plate 22 is connected to the feed tube 5' by an inner connecting tube 23.

The feed liquid is fed into the feed tube 5 of the first element 4 via the feed port 3. Since one end of the feed tube 5 is closed by the deflector block 8, the feed liquid flowed into the feed tube 5 flows out toward the element 4 via its holes and passes through the hollow fiber layer 6 radially outwardly. When the feed liquid passes through the hollow fiber layer 6, only purified water selectively permeates the hollow fibers due to the permselective properties of the hollow fibers. The permeate purified water flows out of the hollow fibers from the tube sheet 7. Then, the purified water is collected by the tube sheet 7 and discharged via the liquid outlet 11.

On the other hand, the non-permeated liquid passes through the gap 12 between the cylindrical pressure vessel 2 and the first element 4 and is collected by the inner support plate 22. Then the liquid is fed into the feed tube 5' of the second element 4' via the inner connecting pipe 23. One end of the feed tube 5' is sealed with the plug 14, so that the feed liquid flows out toward the element 4' via its holes and passes through the hollow fiber layer 6'. Only the purified water selectively permeates the hollow fibers and flows out of the element 4' through the tube sheet 7'. Then, the purified water is collected by the support plate 9' and discharged out of the pressure vessel via the liquid outlet port 11'.

The liquid not permeated through the element 4' passes through the gap 12' between the cylindrical pressure vessel 2 and the second element 4' and is then discharged via the discharge outlet port 13.

Thus, according to the hollow fiber membrane module 21 of the second embodiment, as in the previous embodiment, the feed liquid flows only in one direction, i.e., radially outwardly of the elements from the feed tubes 5, 5' in the module, and the non-permeated liquid is discharged through the discharge outlet port 13 that is provided in one side of the cylindrical pressure vessel 2.

Accordingly, the hollow fiber membrane module 21 of the present embodiment can attain the same advantages as those of the first embodiment.

In the above-mentioned embodiments, the material for the permselective membrane made of hollow fibers is not limited specifically, but may be any material such as acetylcellulose, cellulose triacetate, aromatic polyamide, cross-linked polyamide, polyethylene, polyethylene terephthalate, and polystyrene.

Further, the feed liquid is not specifically limited, but the present invention can also be applied to, for example, sea water, brackish water, river water, well water, ground water, service water, condensed effluent from chemical factories etc, and the like.

Furthermore, the material for the cylindrical pressure vessel, which accommodates the hollow fiber membrane elements, is not limited specifically, but may be any material such as FRP, steel and tough hardened fiber products so long as it has a high pressure resistance and is free of liquid leakage after being molded.

TEST EXAMPLES

Described below is the test results using the hollow fiber membrane modules 1 and 21 of the first and second embodiments.

Example 1

Example 1 was conducted to evaluate the separation performance of the hollow fiber membrane module 1 of the first embodiment.

Example 1-(1)

In Example 1-(1), brackish water was used as a feed liquid. The operating conditions were that the pressure applied was 30 kg/cm$^2$, and the recovery ratio was 75%.

The test results of Example 1-(1) is shown in Table 1 below.

TABLE 1

|  | Permeate Flux (m$^3$/day) | Differential Pressure (kg/cm$^2$) |
| --- | --- | --- |
| Example 1-(1) | 83 | 0.13 |
| Example 2-(1) | 75 | 0.18 |
| Comp. Exmp. 1-(1) | 69 | 0.19 |
| Example 1-(2) | 54 | 0.30 |
| Example 2-(2) | 49 | 0.35 |
| Comp. Exmp. 1-(2) | 45 | 0.47 |

As seen from Table 1, the differential pressure in Example 1-(1) was low, i.e., 0.13 kg/cm$^2$, and the permeate flux through the module was 83 m$^3$/day, which means that the membrane separation was conducted efficiently.

Example 1-(2)

In Example 1-(2), sea water was used as a feed liquid. The operating conditions were that the feed pressure was 55 kg/cm$^2$, and the recovery ratio was 30%. The test results of Example 1-(1) is shown together in Table 1.

As seen from Table 1, the differential pressure in Example 1-(2) was low, i.e., 0.30 kg/cm$^2$, and the permeate flux through the module was 54 m$^3$/day, which means that the membrane separation was conducted efficiently.

Example 2

Example 2 was conducted to evaluate the separation performance of the permselective membrane module 21 of the first embodiment.

Example 2-(1)

In Example 2-(1), brackish water was used as a feed liquid. The operating conditions were that the feed pressure was 30 kg/cm$^2$, and the recovery ratio was 75%.

The test results of Example 1-(1) are shown together in Table 1 below.

As seen from Table 1, in Example 2-(1), the differential pressure was low, i.e., 0.18 kg/cm$^2$ and the permeate flux through the module was 75 m$^3$/day, which shows that the membrane separation was conducted efficiently.

Example 2-(2)

In Example 2-(2), sea water was used as a feed liquid. The operating conditions were that the feed pressure was 55 kg/cm$^2$, and the recovery ratio was 30%. The test results of Example 2-(2) are shown together in Table 1.

As seen from Table 1, the differential pressure in Example 2-(2) was low, i.e., 0.35 kg/cm$^2$, and the permeate flux through the module was 49 m$^3$/day, which means that membrane separation was conducted efficiently.

Comparative Test Example 1

Figure 3:
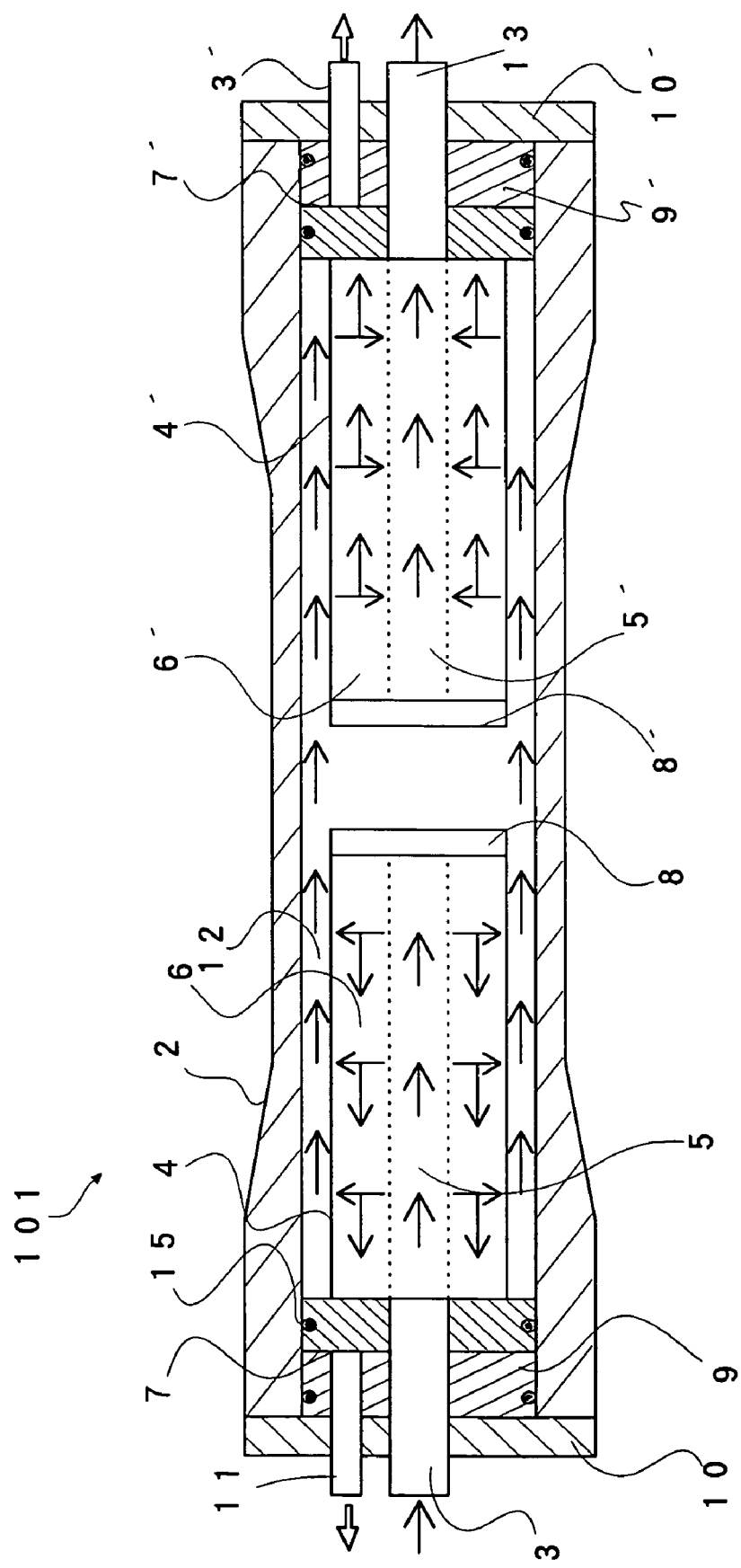
FIG. 3 is a cross section schematically showing a prior art permselective membrane module.

Explained first referring to FIG. 3 is a hollow fiber membrane module 101 used in Comparative Test Examples.

The module 101 has first and second hollow fiber membrane elements 4, 4' which are inserted longitudinally, such that the deflector blocks 8, 8' of the first and second membrane elements 4, 4' face each other. The feed tubes 5, 5' of the respective elements 4, 4' of are located separate from each other.

The feed liquid is fed into the feed tube 5 of the first element 4 via the feed port 3. Since one end of the feed tube 5 is closed by the deflector block 8, the feed liquid flowed into the feed tube 5 flows out toward the element 4 via the holes and passes through the hollow fiber layer 6 radially outwardly. When the feed liquid passes through the hollow fiber layer 6, only purified water selectively permeates the hollow fibers. The permeate purified water flows out of the hollow fibers from the tube sheet 7. Then, the purified water is collected by the tube sheet 7 and discharged via the liquid outlet 11.

On the other hand, the liquid not permeated through the element 104 passes through the gap 12 between the cylindrical pressure vessel 2 and the first and second elements 4, 4' and is fed from outside of the second element 4'. Then the liquid flows radially inwardly of the hollow fiber membrane 6' into the feed tube 5'.

During the process, only the purified water selectively permeates the hollow fibers and flows out of the element 4' through the tube sheet 7'. Then, the purified water is collected by the support plate 9' and discharged out of the pressure vessel via the liquid outlet 3'. On the other hand, the non-permeated liquid flowed into the feed tube 5' is discharged via the discharge outlet port 13.

Explained below is the test results obtained using the prior art permselective membrane module 101 made of hollow fibers.

Comparative Test Example 1-(1)

In Comparative Test Example 1-(1), brackish water was used as a feed liquid. The operating conditions were that the feed pressure was 30 kg/cm$^2$, and the recovery ratio was 75%.

The test results of Comparative Test Example 1-(1) are shown in Table 1.

The prior art hollow fiber membrane modules are compact, but have the disadvantages that the differential pressure was large, i.e., 0.18 kg/cm$^2$, and the amount of liquid permeated through the module was small, i.e., 69 m$^3$/day, as compared with Examples 1-(1) and 2-(1) conducted under the same operating conditions. It will be appreciated from the results that the feed liquid was not efficiently separated with the prior art module. This may be that since the feed liquid in the second element flows radially inwardly from the outside of the element, which causes nestling and thereby generating pressure loss.

Comparative Test Example 1-(2)

In Comparative Test Example 1-(2), sea water is used as a feed liquid. The operating conditions were that the feed pressure was 55 kg/cm$^2$, and the recovery ratio was 30%.

The test results of Comparative Test Example 1-(2) are shown in Table 1.

As seen from Table 1, the differential pressure was large, i.e., 0.47 kg/cm$^2$ and the permeate flux was small, i.e., 45 m$^3$/day, as compared with Examples 1-(2) and 2-(2) which were carried out in the same test conditions. It will be appreciated from the results that the feed liquid was not efficiently separated as in Comparative Test Example 1-(1).

We claim:

1. A permselective membrane module comprising i) two permselective membrane elements formed of hollow fibers arranged substantially in parallel and bundled together and ii) a container, the two elements being arranged in the container longitudinally of the hollow fibers,
   wherein the respective elements comprise i) a feed tube disposed longitudinally of the hollow fibers and ii) a hollow fiber bundle covering the outer surface of the feed tube, the feed tube having a number of holes therein, and the hollow fibers having one end closed and the other end opened,
   wherein the feed tubes of the two elements communicate with each other via a connecting tube to form a conduit having one end opened and the other end closed,
   wherein the container comprises i) an inner wall surrounding the two elements with a space, ii) a feed port provided at one end of the container in communication with the opened end of the conduit, iii) a permeate-liquid outlet facing the open end of the hollow fiber bundle of each element and extending through the container wall, and iv) a non-permeated fluid discharge outlet located as opposed to the outer surface of each element and extending through the container wall in communication with a gap and the outside of the container wall, and
   further wherein the centerline of the discharge outlet of the container being substantially proximal to one end of the container whereby any space downstream of said outlet is sufficiently small to allow purging of suspended materials, thereby minimizing pressure loss in the permselective membrane module.

2. A permselective membrane module comprising i) two permselective membrane elements formed of hollow fibers arranged substantially in parallel and bundled together and ii) a container, the two elements being arranged in the container longitudinally of the hollow fibers, wherein the respective elements comprise i) a feed tube disposed longitudinally of the hollow fibers and ii) a hollow fiber bundle covering the outer surface of the feed tube, the feed tube having a number of holes therein, and the hollow fibers having one end closed and the other end opened, wherein the feed tubes of the two elements have one end opened and the other end closed, wherein the container comprises i) an inner wall surrounding the two elements with a space, ii) a feed port provided at one end of the container in communication with the opened end of the feed tube of one of the elements, iii) an inner liquid receiving plate located between the two elements to collect the liquid not permeated through said one elements, iv) a connecting tube for connecting the inner liquid receiving plate with the open end of the feed tube of the other element, v) a permeate-liquid outlet facing the open end of the hollow fibers of each element and extending through the container wall, and vi) a non-permeated fluid discharge outlet located as opposed to the outer surface of the other element and extending through the container wall in communication with the space and the outside of the container wall, and further wherein the centerline of the discharge outlet of the container being substantially proximal to one end of the container whereby any space downstream of said outlet is sufficiently small to allow purging of suspended materials, thereby minimizing pressure loss in the permselective membrane module.

3. A permselective membrane module comprising i) two permselective membrane elements formed of hollow fibers arranged substantially in parallel and bundled together and ii) a container, the two elements being arranged in the container longitudinally of the hollow fibers, wherein the respective elements comprise i) a feed tube disposed longitudinally of the hollow fibers and ii) a hollow fiber bundle covering the outer surface of the feed tube, the feed tube having a number of holes therein, and the hollow fibers having one end closed and the other end opened, wherein the feed tubes of the two elements communicate with each other via a connecting tube to form a conduit having one end opened and the other end closed, wherein the container comprises i) an inner wall surrounding the two elements with a space and two end walls, ii) feed port provided at one end of the container in communication with the opened end of the conduit, iii) a permeate-liquid outlet facing the open end of the hollow fiber bundle of each element and extending through the end wall of the container adjacent to the open end of the hollow fiber bundle of each element, and iv) a non-permeated fluid discharge outlet located as opposed to the outer surface of each element and extending through the container wall in communication with a gap and the outside of the container wall, and further wherein the centerline of the discharge outlet of the container being substantially proximal to one end of the container whereby any space downstream of said outlet is sufficiently small to allow purging of suspended materials, thereby minimizing pressure loss in the permselective membrane module.

4. A permselective membrane module comprising i) two permselective membrane elements formed of hollow fibers arranged substantially in parallel and bundled together and ii) a container, the two elements being arranged in the container longitudinally of the hollow fibers, wherein the respective elements comprise i) a feed tube disposed longitudinally of the hollow fibers and ii) a hollow fiber bundle covering the outer surface of the feed tube, the feed tube having a number of holes therein, and the hollow fibers having one end closed and the other end opened, wherein the feed tubes of the two elements have one end opened and the other end closed, wherein the container comprises i) an inner wall surrounding the two elements with a space and two end walls, ii) a feed port provided at one end of the container in communication with the opened end of the feed tube of one of the elements, iii) an inner liquid receiving plate located between the two elements to collect the liquid not permeated through said one elements, iv) a connecting tube for connecting the inner liquid receiving plate with the open end of the feed tube of the other element, v) a permeate-liquid outlet facing the open end of the hollow fibers of each element and extending through the end wall of the container adjacent to the open end of the hollow fiber bundle of each element, and vi) a non-permeated fluid discharge outlet located as opposed to the outer surface of the other element and extending through the container wall in communication with the space and the outside of the container wall, and further wherein the centerline of the discharge outlet of the container being substantially proximal to one end of the container whereby any space downstream of said outlet is sufficiently small to allow purging of suspended materials, thereby minimizing pressure loss in the permselective membrane module.

\* \* \* \* \*